No. 644,483. Patented Feb. 27, 1900.
D. E. WILLIAMS.
VEHICLE BRAKE.
(Application filed Nov. 23, 1899.)

(No Model.)

David E. Williams Inventor

Witnesses
Edwin G. McKee
B. G. Peter

By
Attorney

UNITED STATES PATENT OFFICE.

DAVID E. WILLIAMS, OF EAGLEPORT, OHIO.

VEHICLE-BRAKE.

SPECIFICATION forming part of Letters Patent No. 644,483, dated February 27, 1900.

Application filed November 23, 1899. Serial No. 738,068. (No model.)

*To all whom it may concern:*

Be it known that I, DAVID E. WILLIAMS, a citizen of the United States, residing at Eagleport, in the county of Morgan and State of Ohio, have invented a new and useful Vehicle-Brake, of which the following is a specification.

My invention relates to vehicle-brakes, and particularly to that class known as "band-brakes;" and one object is to provide a device of this class that is efficient and quick in operation, simple in construction, and comparatively inexpensive.

A further object is to provide a novel arrangement of parts to obviate applying the brake to the tire of the wheel, thus making it especially applicable to rubber-tired vehicles.

I attain these objects by the construction shown in the accompanying drawings, in which—

Figure 1:
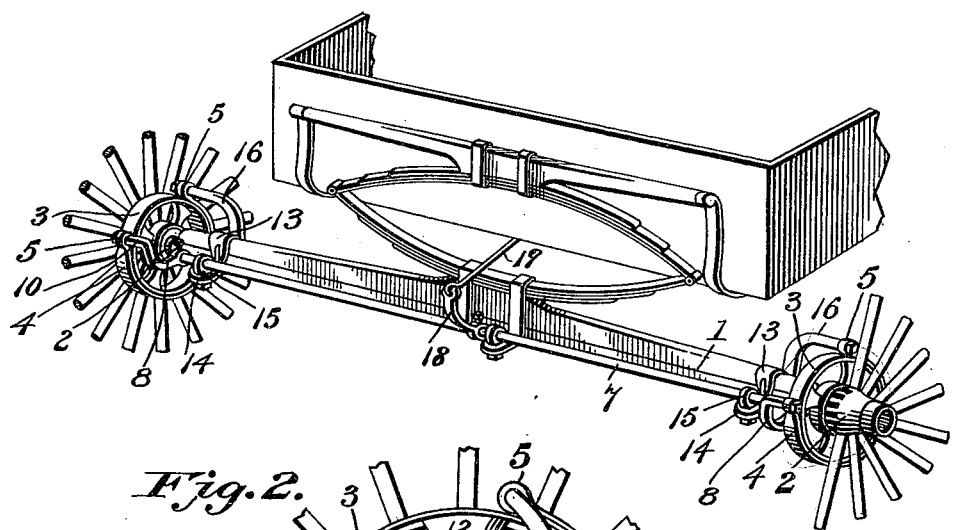
Figure 2:
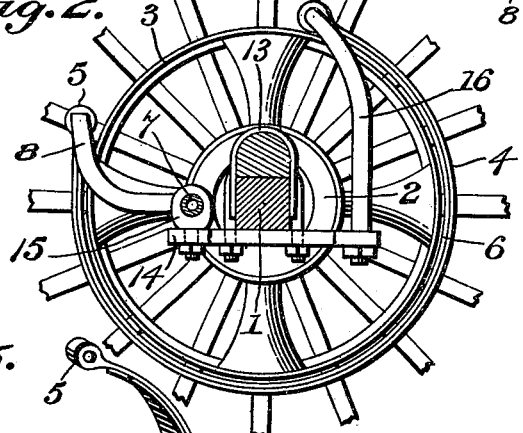
Figure 3:
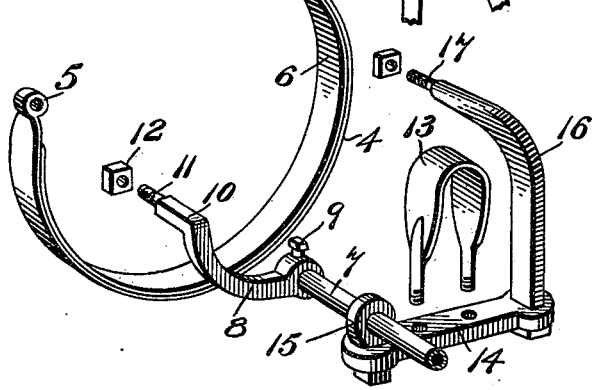

Figure 1 is a perspective view of the back portion of a vehicle, showing my improved brake applied. Fig. 2 is a cross-section more clearly showing the several parts in operative position. Fig. 3 is a detail perspective view showing the construction and arrangement of the band and axle-clip.

The numeral 1 designates the axle of a vehicle, and 2 the wheel-hubs. On the inner ends of the hubs are secured, in any suitable manner, the friction-wheels 3. These friction-wheels, for the sake of lightness, are made of an inner attaching-rim and an outer friction-rim, connected by spokes. They are preferably made of malleable iron and are shrunk upon the hubs. Partly encircling these wheels 3 are the circular spring-steel friction-bands 4, having enlarged eyes 5, and also having the inner side faced with leather or similar material, as at 6.

Extending along the axle 1 and parallel therewith is the rock-shaft 7, on the ends of which are arranged the arms 8, which are secured thereto by the set-screws 9. The outer end of each of these arms is bent outwardly at a right angle, forming the angled extension 10, the outer end of which is rounded and screw-threaded, as at 11, for the reception of the eye 5 of the band 4, which is held thereon by the nut 12. On the shaft 7, midway of its ends, is secured the angular arm 18, to the outer end of which is fastened a suitable rod 19, which extends under the body of the wagon and is connected with a foot-lever or other suitable operating device placed at the front of the vehicle. To hold the rock-shaft in place and also provide means for securing the other end of the friction-band 4 in proper position, I provide the clip 13, which embraces the axle near the hub and has the clip-bar 14, the ends of which extend on each side of the axle and are perforated. In the perforation in one end of the clip-bar is detachably secured the eyebolt 15, which forms a journal for the rock-shaft 7, while in the perforation in the other end is detachably secured the substantially L-shaped supporting-arm 16, the upper end of which bends outwardly and is rounded and screw-threaded, as at 17, similar to the arm 10 and for the reception of the other eye 5 of the friction-band 4. The arms 10 and 17 are so arranged that they will hold the friction-band 4 in proper position to engage the friction-wheel 3 when the rock-shaft 7 is operated.

To operate the device, when the rod 19 is drawn forward by suitable mechanism upon the front of the vehicle the rock-shaft 7 is rotated, the arms 8 thereby drawing the friction-bands 4 tightly against the friction-wheels 3. To release the brake, the power upon the rod 19 is released and the bands 4 will spring out of engagement with the friction-wheel.

It is thus apparent that I have constructed a very simple, inexpensive, and efficient brake that is easy to manipulate and is quick in operation.

Changes in the form, proportion, size, and the minor details of construction may be resorted to without departing from the principle or sacrificing any of the advantages of this invention.

Having now fully described my invention, what I claim as new, and desire to secure by Letters Patent, is—

1. In a device of the class described, the combination with a friction-wheel, of a friction-band partly encircling the friction-wheel, a rock-shaft operatively connected to the friction-band, a bar carried by the axle and having its ends projecting beyond each side thereof, a journal for the rock-shaft carried on one end of said bar and the friction-band fastened to the other end, and means for operating the rock-shaft, to bring the friction-band into engagement with the friction-wheel, substantially as described.

2. In a device of the class described, the combination with a friction-wheel, of a friction-band partly encircling the friction-wheel, a rock-shaft operatively connected to the friction-band, a clip embracing the axle, a straight clip-bar held to the under side of the axle by the clip and having its ends projecting beyond each side of the axle, a detachable journal for the rock-shaft fitted to one end of the clip-bar, a supporting-arm detachably secured to the opposite end of the bar, said arm having one end of the friction-band attached thereto, and means for operating the rock-shaft to bring the friction-band into engagement with the friction-wheel, substantially as described.

In testimony that I claim the foregoing as my own I have hereto affixed my signature in the presence of two witnesses.

DAVID E. WILLIAMS.

Witnesses:
I. N. STILLIONS,
J. T. McDERMOTT.